United States Patent

[11] 3,569,631

[72] Inventors Virgil I. Johannes
Holmdel;
John S. Mayo, Morris Township; Richard
H. McCullough, Summit, N.J.
[21] Appl. No. 727,241
[22] Filed May 7, 1968
[45] Patented Mar. 9, 1971
[73] Assignee Bell Telephone Laboratories, Incorporated
Murray Hill, Berkeley Heights, N.J.

[54] PCM NETWORK SYNCHRONIZATION
5 Claims, 7 Drawing Figs.

[52] U.S. Cl. .......... 179/15
[51] Int. Cl. .......... H04j 3/06
[50] Field of Search .......... 179/15 (ASYNC), 15 (SYNC), 15 (ATC), 15 (VDR)

[56] References Cited
UNITED STATES PATENTS 3,020,419 2/1962 Brightman .......... 307/223
3,042,751 7/1962 Graham .......... 179/15
3,461,245 8/1969 Johannes et al. .......... 179/15

*Primary Examiner*—William C. Cooper
*Assistant Examiner*—David L. Stewart
*Attorneys*—R.J. Guenther and E.W. Adams, Jr.

ABSTRACT: Pulse signals from a plurality of unsynchronized sources are time-division multiplexed on a high-speed pulse transmission system having a pulse repetition rate submultiples of which are approximately equal to the repetition rate of the signals to be multiplexed. Multiplexing is accomplished by inserting control pulses or deleting pulse information from the pulse sources when necessary so as to maintain the pulse signals at a predetermined repetition rate equal to a submultiple of the line rate. The presence and location of the control pulses and the fact that deletion has occurred as well as whether a pulse or a space has been deleted from a particular pulse source are signalled to the receiving apparatus by transmitting signaling information in a predetermined channel space enabling the receiving apparatus to delete the control signals and restore any deleted signals.

INVENTORS V. I. JOHANNES
J. S. MAYO
R. H. Mc CULLOUGH
BY [signature]
ATTORNEY

PCM NETWORK SYNCHRONIZATION

BACKGROUND OF THE INVENTION

In contemplating a pulse communication network of continental scope, pulse signals of relatively low pulse repetition frequency or speed will be interleaved or time-division multiplexed with other such signals to form a high-speed pulse signal for transmission on a common facility such as a transcontinental waveguide. The process of interleaving or time-division multiplexing low-speed signals into a high-speed signal requires almost exact synchronization of the low-speed signals. Otherwise, pulses will be inadvertently added to one or more of the slower pulse repetition frequency signals or pulses lost in the pulse signals of higher pulse repetition frequency. In either situation, framing synchronization will be lost which has the effect of opening the circuit until framing is restored. When this happens, information is lost.

Initially, it might be thought that this problem could be overcome by the use of a common clock signal transmitted to all parts of the communication network for synchronization purposes, but such a solution appears undesirable for several reasons. First, such a system would require expensive clock signal transmission facilities. Second, synchronization at the highest pulse repetition rates requiring the greatest accuracy of timing is almost impossible due to variations in the parameters of the transmission facilities employed. For example, local variations in the transmission characteristics of such facilities due to temperature, humidity, and other local effects which would cause changes in the effective pulse rate at the end of a pulse transmission system even through the input pulse rate was constant. The apparatus is also vulnerable to loss of master clock source.

A number of proposals directed to the multiplexing of low-speed signals onto a high-speed long distance transmission facility, using time division techniques have been made. A first, described in U.S. Pat. No. 3,042,751, issued to R. S. Graham on Jul. 3, 1962, describes a transmission system in which a plurality of asynchronous pulse trains derived from nonsynchronized transmitters are retimed by a common clock source of slightly higher repetition rate than the highest pulse rate to be synchronized. To accomplish this result, a variable delay is included in the path of each pulse train and the delay continuously reduced at a rate sufficient to maintain synchronism with the clock source. Because the clock source is at a higher repetition rate than any of the asynchronous pulse trains, the reduction in delay eventually becomes a full pulse period, and at this time an extra pulse is inserted in the pulse train to bring its repetition rate up to that of the clock source. Simultaneously, the full delay is reinserted in the pulse path. In order to restore the original timing and delete the extraneous pulses, information concerning the value of the delay in each of the pulse paths is encoded and transmitted to the receivers.

A second proposal directed toward the solution of this problem is that disclosed in U.S. Pat. No. 3,136,861, issued to J. S. Mayo on Jun. 9, 1964. In that patent each pulse signal to be multiplexed has its pulse repetition rate raised to a common higher repetition frequency by the insertion of control signals into the pulse train and after multiplexing, transmitting, demultiplexing, and receiving the transmitted signal, predictive techniques are employed to remove the inserted control signals even in the presence of large transmission errors. The predictive techniques determine when a control signal should have occurred in the transmitted signal, and when a control signal is lost this determination is used to minimize the loss.

A third proposal directed toward the solution of this problem is that disclosed in copending U.S. Pat. application, Ser. No. 507,008, now U.S. Pat. No. 3,461,245, filed on Nov. 9, 1965 by V. I. Johannes and R. H. McCullough. In accordance with the embodiment of the invention disclosed in that patent application, the repetition rates of pulse signals from a plurality of asynchronous pulse sources are raised to a common repetition rate for transmission on a high-speed time-divided facility. A control signal is inserted, when necessary, into the signal from each source at a unique time, different from that of every other source, with reference to a predetermined portion of the transmitted high-speed signal. The presence and location of the control signals are signaled by transmitting code words in that predetermined portion of the high-speed signal. A first transmitted code word, designated an M code word, establishes a time reference at the receiving terminal even in the presence of several transmission errors. Following the transmission of the M code word, a second series of code words, designated C code words, are transmitted to the receiving terminal. One such code word is assigned to each of the multiplexed signals and its appearance is used to indicate that a control signal has been inserted in the respective signal. When a C code word indicates that the signal from a particular pulse transmitter has had a control signal inserted therein, the control signal is removed by the receiving apparatus which is actuated at the proper time by the time reference established by the M code and the predetermined fact that each pulse transmitter has its control signals inserted at a unique time with reference to the predetermined portion of a common time-divided transmission facility allocated for the transmission of each bit of the above-mentioned code words. In an illustrative embodiment of the invention, as described in the above-mentioned patent application, a single bit of each frame is allocated to the transmission of the above-mentioned codes.

It is similarly an object of the present invention to synchronously combine or synchronously operate upon a plurality of asynchronous pulse trains of varying pulse repetition rate to retime each of the plurality of pulse trains to a common pulse repetition rate for transmission over a common time-divided transmission facility.

SUMMARY OF THE INVENTION

In accordance with this invention, pulse signals from a plurality of unsynchronized sources are time-division multiplexed on a high-speed pulse transmission system, having a pulse repetition rate submultiples of which are approximately equal to the repetition rate of the signals to be multiplexed. Multiplexing is accomplished by inserting control pulses or deleting pulse information from the pulse sources when necessary so as to maintain the pulse signals at a predetermined repetition rate equal to a submultiple of the line rate. The presence and location of the control pulses and the fact that deletion has occurred as well as whether a pulse or a space has been deleted from a particular pulse source are signaled by transmitting signaling information in a predetermined channel space enabling the receiving apparatus to delete the control signals and restore any deleted signals. A relatively small amount of such channel space is necessary to maintain the pulse repetition rate of the signals at the predetermined line rate. Thus, in accordance with this invention, pulse signals from the plurality of asynchronous pulse rates, whose repetition rates are only approximately that of a submultiple of the line rate, may be multiplexed on a common time-divided pulse transmission system, whereas apparatus embodying the invention described in the above copending application is limited to multiplexing signals from transmitters whose pulse rates are all less than a submultiple of the line rate. The present invention, therefore, provides greater latitude of operation so that there is no interruption of transmission in the event the pulse rate of the signals from a particular pulse transmitter rises above a submultiple of the line rate which interruption would occur when apparatus embodying the invention of above-mentioned copending application is employed.

BRIEF DESCRIPTION OF THE DRAWINGS

The invention will be more fully comprehended from the following detailed description taken in conjunction with the drawings in which.

DEATAILED DESCRIPTION OF THE INVENTION

Figure 1:
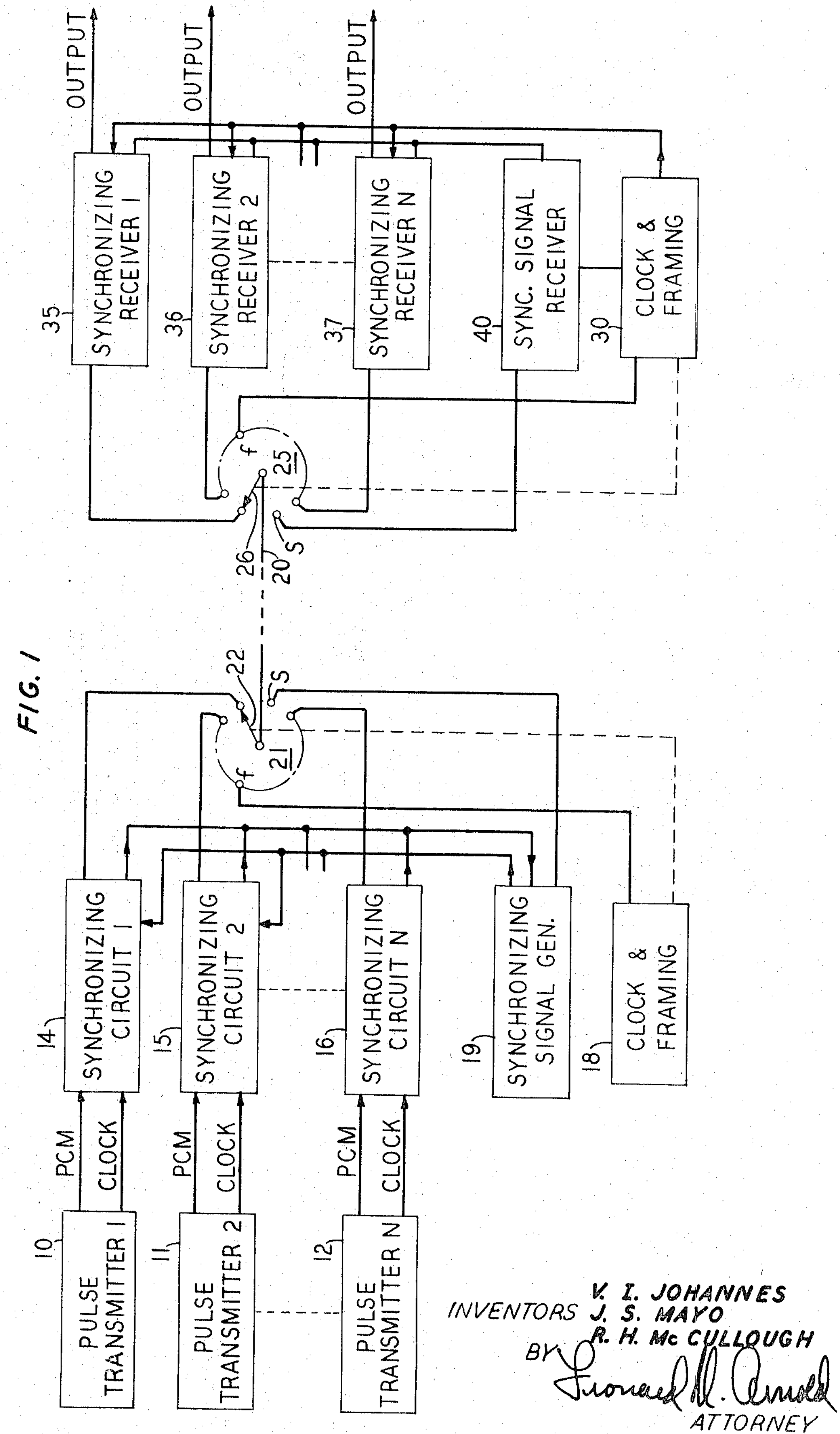
FIG. 1 is a simplified block diagram of a multiplexing system in accordance with the present invention.

A time-division multiplexing system, in accordance with the present invention, is shown in block diagram form in FIG. 1. Pulse signals from a plurality of pulse transmitters 10, 11...12, which may be at geographically separated locations, are retimed to a common pulse repetition frequency through either the insertion of control signals or the deletion of pulse information by centrally located synchronizing circuits 14, 15...16. These synchronizing circuits are controlled by a clock and framing circuit 18 and a synchronizing signal generator 19. The retimed signals are to be transmitted by time-division multiplex techniques over a transmission facility 20, such as a line, which may, in fact, be a microwave waveguide or other high-speed, high-capacity system. The total time available on transmission facility 20 is divided into a sequence of discrete time intervals commonly called "time slots" or "bits" by means of a multiplex distributor herein represented as a commutator 21 which has *n* segments. The retimed pulse signals from each synchronizing circuit 14, 15...16 are assigned to one or more time slots on transmission facility 20 by the connection of each synchronizing circuit to one or more segments of commutator 21 whose brush 22 is driven by a signal from the clock and framing circuit 18. As a result, the retimed pulse signals are sequentially applied to the transmission facility 20 and a period of *n* "bits" or "time slots" is designated as a frame of the transmission facility.

Two segments of commutator 21 are employed for the transmission of special information. A first, designated in FIG. 1 as the S segment, is connected to one output terminal of synchronizing signal generator 19. The signals applied to segment S by generator 19 indicate which, if any, of the synchronizing circuits 14, 15...16 has inserted a control signal into the output of its respective pulse transmitter 10, 11...12, or which, if any, of these synchronizing circuits has deleted a signal from the output of its respective pulse transmitter and the nature of the signal deleted. A second of the *n* terminals, designated as the *f* terminal in FIG. 1, is connected to one output terminal of the clock and framing circuit 18, and as a result, framing signals are applied to this *f* terminal so that the multiplexing and demultiplexing equipment may be kept in synchronism. The clock and framing circuit may be that described in U.S. Pat. No. 2,984,706 issued to H. M. Jamison et al. on May 16, 1961.

At the distant end of transmission facility 20, the multiplex signals are separated by the action of commutator 25 whose *n* segments are sequentially contacted by brush 26. The brush 26 is controlled by a clock and framing circuit 30 which recovers the basic pulse repetition rate of the transmitted signals and frames the transmitted signals so that brushes 22 and 26 are continuously in phase. For this purpose, an input signal provided from the *f* terminal of commutator 25 is supplied to the clock and framing circuit 30 while an output signal of clock and framing circuit 30 controls the operation of brush 26. As is well known in the art, commutators 21 and 25 may, in fact, be electronic commutators of any type, and the clock and framing circuit 30 may be that disclosed in U.S. Pat. No. 2,527,650, issued to E. Petersen on Oct. 31, 1950.

Each segment of commutator 25 other than segments *f* and S, is connected to a synchronizing receiver 35, 36...37, each of which functions to remove any inserted control signals or restore any deleted signals under the control of synchronizing signal receiver 40 so that the output of each synchronizing receiver 35, 36...37, is identical to the output of each pulse transmitter 10, 11...12, respectively, and possesses the original timing of the signals.

Each of the pulse transmitters 10, 11...12, generates a signal which has a repetition rate which is approximately that of a submultiple of the line repetition rate. That is to say, each pulse transmitter is assigned a specific portion of the time-divided transmission facility and its pulse repetition rate is approximately the pulse repetition rate of the portion of the line to which it is assigned. As a result, the pulse transmitters may at any instant of time be operating at a repetition rate which is either slightly above or slightly below the repetition rate at which it should be operating in order for its pulse signals to be placed on the line. Broadly, the function of the synchronizing circuits 14, 15...16, is to either add control signals to or delete signals from the signals generated by the pulse transmitters 10, 11...12, in order to effect synchronization on the line.

Considering the transmitting terminal in somewhat more detail, the synchronizing circuits 14, 15...16, and the synchronizing signal generator 19 operate in the following manner:

Considering those pulse transmitters whose pulse repetition rates are at any time slightly less than the line rate of the portion of the transmission line to which they are assigned, pulse signals are read out of the synchronizing circuit to which they are connected at a rate which is somewhat greater than the rate at which the pulse signals are applied to the synchronizing circuit from its associated pulse transmitter. From time to time, therefore, each such synchronizing circuit will approach a condition in which there is no pulse signal stored therein and, therefore, it is necessary to insert a control signal in the output of the synchronizing circuit so that due to the insertion of the control signal additional pulse signals can be applied to the synchronizing circuit to allow its input to catch up with its output. When the generation of a control signal becomes necessary, the synchronizing circuit concerned generates a signal which is applied to the synchronizing signal generator 19 to inform the synchronizing signal generator 19 that a control signal is about to be inserted in the output of the synchronizing circuit. As to those pulse transmitters which are generating pulse signals at a rate which is greater than the rate of that portion of the transmission line to which they are assigned, the synchronizing circuits will approach a condition in which the number of pulse signals stored therein exceeds a predetermined capacity and it is necessary to delete a pulse signal from the output of the synchronizing circuit so that the output can catch up with its input. When such deletion becomes necessary, the synchronizing circuit concerned generates a signal which is applied to the syncrhronizing signal generator 19 to inform the synchronizing signal generator that a signal is to be deleted in the output of that synchronizing circuit. When the signal is deleted information concerning the nature of the signal deleted is applied to the synchronizing signal generator so that appropriate signaling information may be transmitted to the receiving terminal.

Figures 2, 3:
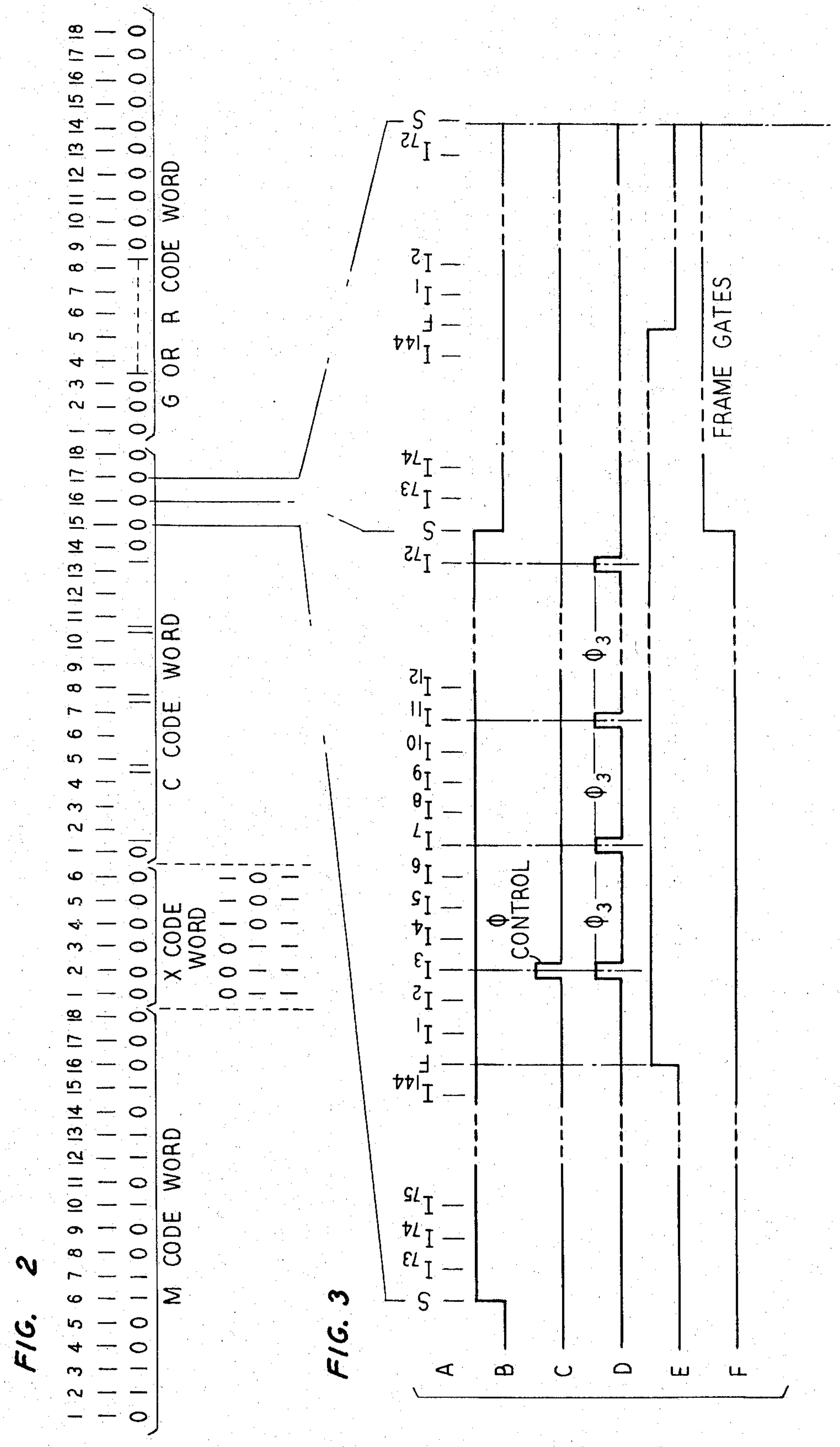
FIG. 2 is an illustration of 60 bits of the signal transmitted in the predetermined bit of the high-speed transmission signal allocated to the transmission of the control signal information.
FIG. 3 is a group of waveforms illustrating the times in which the control signals are inserted into the signals from the pulse transmitters.

In the absence of the necessity for the insertion of a control signal into the output of any of the synchronizing circuits, or the deletion of a pulse signal therefrom, synchronizing signal generator 19 applies a predetermined signal to that segment of commutator 21 denoted as the S segment in FIG. 1. Thus in each S bit or time slot which occurs once each frame, a frame being defined above, predetermined pulse signals are applied to the transmission medium. In the illustrative embodiment of this invention, the signals present in the S bit are divided into four groups of 60 bits, with each 60-bit group consisting of a first code word of 18 bits, designated the M code word, a second code word of 6 bits, designated the X code word, and two following code words of 18 bits each, designated as the C code and G or R code words as shown in FIG. 2. The words of 60-bit length are applied repetitively to the S segment of the commutator and these 60-bit word groups are applied in groups of four. In the absence of the insertion of control signals or deletion of signals, the first 60-bit group, designated hereafter as $A_1$, is as is shown in FIG. 2 and comprises the M code word followed by 42 zeros. The second 60-bit word group, in the absence of the insertion or deletion of signals and designated hereafter as $A_2$, is as shown in FIG. 2 with the exception of the fact that the so-called X code word has been changed from six consecutive zeros to a word having the first three bits as zeros and the last three bits as ones. Similarly, the third grouping of 60 bits, designated $A_3$, applied to the S bit, is as shown in FIG. 2 with the exception of the fact that the X code word now has three ones in its first three time slots. Finally, the fourth group of 60-bit words, designated $A_4$, comprises the same pattern shown in FIG. 2 with the exception of the fact that the X code word is now all ones. After the generation of 240 bits, the cycle repeats the code word being generated as shown in FIG. 2.

In the absence of the necessity for the insertion of a control pulse in or the deletion of a signal from the output of any of the synchronizing circuits, the signal applied to the S segment of commutator 21 is that described above. This code pattern of 240 bits divided into four groups, $A_1$, $A_2$, $A_3$ and $A_4$, is continuously repeated in the absence of the necessity for either the transmission of a control signal or the deletion of a pulse signal and functions not only to inform the receiving apparatus that no control signals are being inserted into or signals deleted from the output of any of the synchronizing circuits 14, 15...16, but also to create a time reference for the receiving apparatus such that, as will be explained later, the receiving apparatus is able to create a time reference to delete an inserted control signal or add a deleted signal even in the presence of error in transmission. Again the only change made in the signals present in the S bit in the absence of an inserted control pulse or a deleted signal is that the X code words repetitively assume the words indicated in FIG. 2 and this serves to identify the following C code words, such that the receiving apparatus is able to determine whether either a control signal has been inserted or a pulse signal deleted, and if a pulse signal has been deleted whether the signal deleted was a pulse or a space.

For the sake of a clearer understanding of apparatus embodying the present invention, consider first the first group, $A_1$, of 60 bits applied to the S terminal of the commutator. These 60 bits are shown in FIG. 2 wherein the X code word, that is the word following the 18-bit M code word, comprises six consecutive zeros. This first group of 60 bits, designated $A_1$, is used to provide information to the receiving apparatus to inform the apparatus if a control signal has been inserted in the output of a pulse transmitter and if such a signal has been inserted to inform the apparatus which pulse transmitter has had a control signal inserted in its output. To accomplish these ends, an interrogate signal is generated by the synchronizing signal generator 19 at a time corresponding to the 15th bit of the M code word and this interrogate signal is applied to all the synchronizing circuits 14, 15...16. If any of these synchronizing circuits require that a control signal be inserted in their output, because their pulse repetition rate has dropped sufficiently below the line rate as indicated by the amount of pulse signals stored in the synchronizing circuit, the synchronizing circuit generates a signal which, as before described, activates the synchronizing signal generator which then generates a predetermined code during a portion of the second through 13th time slots of the C code word of group $A_1$. This code which is hereinafter called a C code informs the receiving apparatus as to which of the synchronizing circuits 14, 15...16 has inserted a control signal in the output of its associated pulse transmitter 10, 11...12.

Each synchronizing circuit 14, 15...16, inserts a control signal into, or deletes a signal from the output of its associated pulse transmitter in a predetermined time slot of signals from that transmitter over the transmission medium. In the illustrative embodiment of this invention, these predetermined time slots for the insertion of control signals or deletion of signals, occur in the frame, as defined above, occurring between the 15th and 16th S time slots of the C code word shown in FIG. 2. FIG. 3 shows the time interval between the 15th and 17th S time slots. In FIG. 3B, S designates the S time slot, of which three are shown. They are the 15th, 16th, and 17th and this is indicated by the interconnecting lines between FIGS. 2 and 3. The framing time slot is designated, F, in FIG. 3A and the time slots devoted to the transmission of information are designated, I, with an appropriate subscript to indicate the number of the information time slot with respect to the framing pulse. In the illustrative embodiment of the invention, as is shown, the S bit occurs between the 72nd and 73rd infomation time slots. The remaining drawings in FIG. 3 will be referred to below.

Since the M code word establishes, even in the presence of transmission errors, a time reference for the receiving apparatus, as will be described below, the receiving apparatus is able to accurately locate the bit of the transmission frame in which a control signal has been inserted and to remove that control signal.

The synchronizing signal receiver 40 at the receiving terminal receives the codes transmitted during the S bits of the transmission frame, generates the time reference, and determines which of the synchronizing circuits 14, 15...16, if any, has inserted a control signal into or deleted an information signal from the output of its associated pulse transmitter. The synchronizing signal receiver 40 upon such a determination activates that one of the synchronizing receivers 35, 36...37, so that the control signal is removed from or the deleted signal inserted into the demultiplexed signal by the synchronizing receiver 35, 36...37, associated with a predetermined one of the synchronizing circuits 14, 15...16.

The second group of 60 S bits transmitted during the S time slot and designated $A_2$ is identical to that shown in FIG. 1, except that the X code word in the six bits following the M code word comprises a first group of three zeros in the first three time slots of the X code word and three ones in the fourth to sixth time slots of the X code word. The following 36 bits of the C code word and the G or R code word are always zeros. This group of 60 bits transmitted in the S bit is not utilized in the illustrative embodiment of the invention described, in the sense that no information is transmitted with respect to either pulse deletion or pulse insertion.

The third group of 60 bits transmitted in the S-bit time slot and designated $A_3$, is identical to that shown in FIG. 2, with the exception of the fact that the X code word now consists of three ones or pulses in the first three time slots and three zeros in the fourth to sixth time slots. This group of 60 bits is used not only to create a time reference at the receiving terminal, but also to transmit to the receiving terminal information that a pulse signal has been deleted from a particular one of the pulse transmitters. As before, in the absence of the necessity for the deletion of a pulse signal in the output of any of the synchronizing circuits, the signal applied to the S segment of commutator 21 is simply the so-called M code word shown in the first 18 S bits followed by the X code word 111000 followed by 36 zeros.

At a time corresponding to the 15th bit of the M code word of the $A_3$ group, an interrogate signal is again generated by the synchronizing signal generator 19 and applied to all the synchronizing circuits 14, 15...16. If any of these synchronizing circuits require that a pulse signal be deleted from their output because the output of the associated pulse transmitter has created a storage level within the synchronizing circuit which exceeds a predetermined capacity, the synchronizing circuit generates a signal which activates the synchronizing signal generator so that it generates a predetermined code during a portion of the 2nd through 13th time slots of the C code word in the third group $A_3$ of the 60-bit words, the first of which is shown in FIG. 2. This C code informs the receiving appartus as to which of the synchronizing circuits 14, 15...16 has deleted a signal from its ouptput.

As is the case where control signals are added to the output of the synchronizing circuit in a predetermined time slot pulse signals are deleted from the output of the pulse transmitter during a predetermined time slot. In the illustrative embodiment of this invention, these predetermined time slots occur in the frame, as described above, occurring between the 15th and 16th S time slots of the C code word of the fourth group, $A_4$, of S bit words. FIG. 3 shows the time interval between the 15th and 17th S time slots.

Finally, the fourth group, $A_4$, of 60 S bits is used to transmit signals to the receiving terminal to inform the receiving apparatus as to whether whether the signal deleted from a particular synchronizing circuit, as indicated by the information received during the third group, $A_3$, of S bits, was a pulse or a space. When the signal received during that portion of the C code word allocated to a particular transmitter comprises three consecutive zeros, then the receiving apparatus is informed that the signal which has been deleted was a zero. When, however, the signal received comprises three consecutive pulses or ones, then the receiving apparatus is informed that the signal which was deleted was a one.

Figure 4:
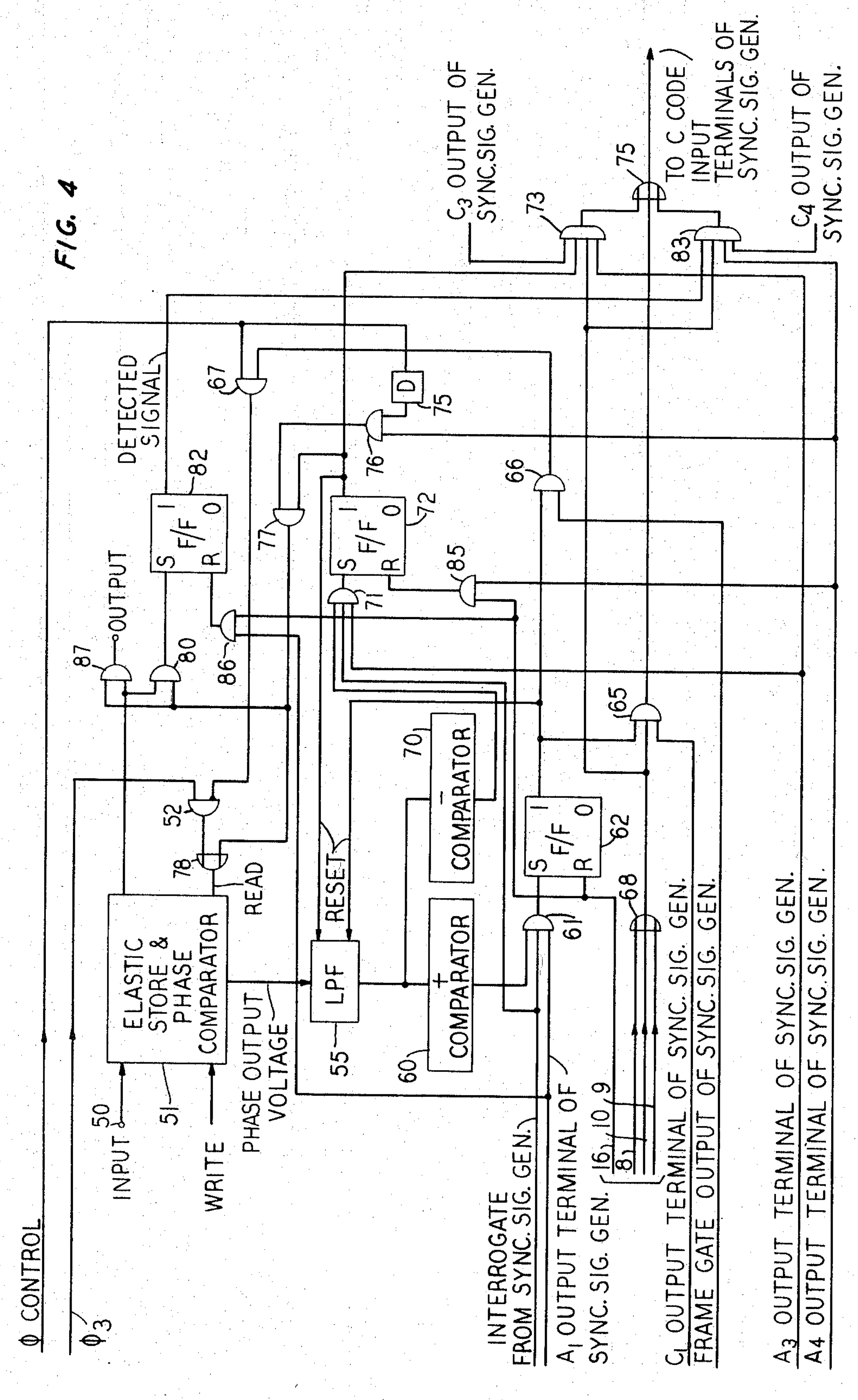
FIG. 4 is a block diagram of a synchronizing circuit shown in FIG. 1 for a relatively high-speed pulse transmitter.

A synchronizing circuit 14, 15...16 for converting the asynchronous pulse trains to trains of a common repetition frequency is shown in FIG. 4. The input signals from the respective pulse transmitter 10, 11...12 is applied to the input terminal 50 of the synchronizing circuit. The terminal 50 is connected to the input of an elastic store such as that shown in U.S. Pat. No. 3,093,815, issued to M. Karnaugh on Jun. 11, 1963. In such a store the input pulses may be read out at a repetition rate which is different from the rate at which they are read in and stored. In addition, there is provided an output voltage called the phase output voltage, which is a measure of the difference in phase between the input and output signals, i.e., it is proportional to the number of pulses stored. In the above-mentioned patent, the data are read out of the store under the control of an oscillator which in turn is controlled by the phase output voltage. In its use in the present system, this oscillator is eliminated and the readout governed under the control of external circuitry to be described below.

A multiplexing system embodying this invention will be described wherein pulse signals from four pulse transmitters of the same nominal pulse repetition rate are to be multiplexed. Thus, if the transmission system has a speed of 220 megabits per second, the signals from four 55 megabit per second pulse transmitters will be described as being multiplexed thereon. In such an embodiment of the invention, a pulse signal from each pulse transmitter is transmitted in every forth information bit of the transmitted signal. Furthermore, as an example, consider that the apparatus shown in FIG. 4 corresponds to the synchronizing circuit associated with a pulse transmitter whose pulse signals are transmitted in the third, seventh, 11th...etc., information time slots of each frame of the transmitted signal. In accordance with this invention, the apparatus is capable of transmitting the pulse signals from the pulse transmitter over the line irrespective of whether the actual pulse repetition rate from the pulse transmitter is greater than or less than the nominal 55 megabit per second rate. The apparatus shown in FIG. 4 is capable of operating upon the input signal at terminal 50 either to insert control pulses at such times that the store 51 has less than a first predetermined number of pulse signals stored therein, or to delete pulse signals when the elastic store has greater than a second predtermined number of pulse signals stored therein due to the fact that the input signal rate has increased beyond the 55 megabit per second rate. Where the signals from four pulse transmitters are to be multiplexed the C code word is divided into four parts in the following manner: The first bit is always transmitted as a zero as are the 14th through 18th. The second through 13th bits are divided into four parts of three bits each. The first part denoted $C_1$, comprising the second through fourth time slots is allocated to the first transmitter (i.e., that transmitter whose signals are transmitted in the first, fifth, ninth...etc., time slots). When a control signal is added to the output of that transmitter three consecutive pulses are transmitted in the second through fourth time slots of the above-defined $A_1$ group of S bits. When a signal is deleted from the output of that transmitter three consecutive pulses are transmitted in the second through fourth time slots of the $A_3$ group of S bits. If a pulse has been deleted from the output of the first pulse transmitter, then, in addition to the above-mentioned signal in the $A_3$ group of S bits, three pulses are transmitted in the second through fourth time slots of the $A_4$ group if a pulse was deleted; but, if a space has been deleted, then the signals transmitted in the second through fourth time slots of the $A_4$ group are spaces. Similarly, the fifth through seventh, eighth through 10th, and 11th through 13th bits of the C code word are allocated to the second, third, and fourth transmitters respetively and they are denoted as $C_2$, $C_3$ and $C_4$ respectively.

Initially, in order to facilitate an understanding of the illustrative embodiment of this invention, assume that the pulse transmitter associated with the apparatus shown in FIG. 4 is operating at a rate which is somewhat lower than the 55 megabit rate, so that the apparatus serves to insert control signals in the output of the synchronizing circuit to bring the signals from the pulse transmitter up to the 55 megabit rate.

Under the control of the clock and framing circuit 18, pulses are generated during the third, seventh, 11th...etc., information time slots of each frame of the transmitted signal by well-known techniques involving frequency division. These signals, designated $_3$, and shown in FIG. 3D are applied through INHIBIT gate 52 and OR gate 78 to read terminal of elastic store 51, and in response to each such signal, a pulse signal is read out of this store. Thus, the input signal at terminal 50 is read out onto the transmission facility under the control of the $_3$ signal, and this process continues so long as the pulse signals stored in store 51 are at such a level that they do not fall beneath a predetermined level indicating that it is necessary to insert a control signal in the output of the elastic store. Such a condition, namely that the level of storage of pulse signals has fallen below a predetermined level, indicates that the input signal is at less than the nominal rate to which it is to be multiplexed onto the transmission line and it is, therefore, necessary to insert a control signal.

The quantity of signals stored in store 51 is periodically examined to determine whether the level of storage has dropped below the predetermined level. This is accomplished by means of an interrogate signal received from the synchronizing signal generator 19 which is described in detail below. The interrogate signal occurs simultaneously with the 15th bit of the M code word of the first group, $A_1$, of 60 S bits, and when the quantity of signals stored in store 51 has been drained to a predetermined level, the phase output voltage of the store 51 applied through a low-pass filter 55 to a comparator circuit 60, causes the comparator circuit 60 to generate an output signal. The output signal of comparator 60 is applied to one input terminal of AND gate 61 which is enabled by the interrogate signal and a signal present at the $A_1$ output terminal of the synchronizing signal generator which signal is generated during the occurrence of the first group of 60 S bits shown in FIG. 2. The resulting output signal sets a bistable circuit 62.

The output signal generated by bistable circuit 62 has three functions. First, it serves to apply three marking pulses to the synchronizing signal generator so that the synchronizing signal generator generates three marking pulses in the eighth, ninth and 10th S time slots of the C code word of the $A_1$ group. This is accomplished by the actuation of AND gate 65 which is enabled during the eighth, ninth and 10th time slots of the C code word by signals applied from the synchronizing signal generator 19 through OR gate 68 and a signal designated $C_1$ generated during the C code word of the $A_1$ group by the synchronizing signal generator 19. Thus, the output of bistable circuit 62 causes pulses to be transmitted during the eighth, ninth and 10th bits of the C code word of the $A_1$ group. This signal serves to inform the receiver that a control signal is being inserted in the time slot assigned to the third transmitter. Second, the output signal from bistable circuit 62 enables AND gate 66 during the presence of a gating signal, generated by the synchronizing signal generator 19 and shown in FIG. 3B which occurs in the transmitting period bounded by the 15th and 16th S time slots of the C code word. Thus, when bistable circuit 62 produces an output signal indicating that a control signal is to be inserted in the output of store 51, this control signal can only be inserted in the transmitting period bounded by the 15th and 16th S bits of the C code word in the first group of 60 S bits. The output signal from AND gate 66, which is a gating signal, shown in FIG. 3B, occurring between the 15th and 16th S time slots, enables a second AND gate 67. A signal present during a predetermined time slot of that transmission frame, in this example, the third message time slot, causes the AND gate 67 to produce an output signal which inhibits INHIBIT gate 52 so that no information is read out of the elastic store during that predetermined time slot. This signal which causes AND gate 67 to generate an output signal is designated $_{control}$ and is shown in FIG. 3C. Third, the output of bistable circuit 62 resets the output of low-pass filter 55.

Thus, in summary, the synchronizing circuits shown in FIG. 4 operate to insert a control signal in the transmitted signal at a predetermined time determined by a $_{control}$ pulse when the pulse repetition rate of the input signal drops below a predetermined level. That is to say, control signals are inserted into the output of such a pulse transmitter in a predetermined one of the time slots in a given frame allocated to the transmission of pulse signals from that pulse transmitter. In this example, a control signal is inserted into the first time slot of the transmitting period bounded by the 15th and 16th S time slots which is allocated to the transmission of information signals from the pulse transmitter. This is accomplished by generating at the synchronizing signal generator, a gating signal shown in FIG. 3B during the transmitting period in which the control signal is to be inserted, and generating a control signal occurring during the predetermined time slot allocated for the insertion of control signals when such insertion is necessary. To indicate that a control signal has been inserted in the predetermined time slot, a C code word is generated and serves to inform the receiver which synchronizing circuit has inserted a control signal so that the receiver may remove it.

When the pulse rate of the pulse transmitter connected to input terminal 50 of the synchronizing circuit shown in FIG. 2 increases to a higher rate than the 55 megabit per second rate used in our illustrative example, then the level of pulse signals stored in store 51 as indicated by the output of low-pass filter 55, exceeds a predetermined level and in order to avoid exceeding the capacity of store 51, it is necessary to read out a signal from store 51 in such a manner that it is not transmitted so that the output keeps up with the pulse input rate applied to terminal 50. Toward this end, comparator 70 is connected to the output of low-pass filter 55 and generates an output signal when store 51 has stored in it pulse signals exceeding a predetermined quantity. The output from comparator circuit 70 is applied to one input terminal of AND gate 71 which is enabled when the interrogate signal from the synchronizing signal generator is present as well as the $A_3$ output signal from the synchronizing signal generator indicating that the third group of the 60 S bit group of code words is occurring. The simultaneous occurrence of these three signals generates an output signal which sets a bistable circuit 72 whose output signal is applied to one input terminal of AND gate 73 and is also applied to reset low-pass filter 55. A second input terminal of AND gate 73 is connected to the output of OR gate 68 and the third input terminal is connected to the $C_3$ output terminal of the synchronizing signal generator, so that during the eighth, ninth and 10th bits of the C code word of the third group of 60-bit words, AND gate 73 is enabled and its output signal is applied through OR gate 75 to the C code input terminals of the synchronizing signal generator for transmission to the receiving terminal to inform the receiving apparatus that a pulse signal will be deleted from the output of the third pulse transmitter during the predetermined time slot designed $_{control}$ of the fourth group, $A_4$, of S bits.

During the fourth group, $A_4$ of the 60-bit groups of S bits, the $A_4$ output terminal of the synchronizing signal generator has an enabling signal thereon and this signal together with the $_{control}$ signal delayed by a delay circuit 75 which inserts a delay of two time slots is applied through AND gate 76 to enable AND gate 77 which produces an output signal which is applied to OR gate 78. An extra read signal is thus applied to elastic store 51 so that a signal is read out of the store, but the signal read out of the store is not applied to the output due to the action of INHIBIT gate 87 which is activated by the output of AND gate 77. As a result, this signal is not regenerated by the pulse transmission system and it is therefore lost as far as direct transmission over the medium is concerned. However, the signal applied from AND gate 77 to OR gate 78 and INHIBIT gate 87 also enables AND gate 80 which receives on a second input terminal the signal read out of the elastic store 51 so that the signal deleted from the transmitted signal, if a pulse, will set bistable circuit 82 whose output signal is applied to one input terminal of AND gate 83 which is enabled during the eighth, ninth and 10th time slots of the C code word of the fourth group, $A_4$, of the 60 S bit words by signals on the $A_4$ and $C_4$ output terminals of the synchronizing signal generator. Thus, if a pulse has been deleted from the signal as represented by a one at the one output terminal of bistable circuit 82, then three consecutive ones will be transmitted during that eighth, ninth and 10th time slots of the C code word of the fourth group, $A_4$, of 60 S bit words. In the event that a space was deleted, however, then three consecutive zeros will be transmitted during those time slots since AND gate 83 will not be enabled. The bistable circuit 72 is reset during the 16th time slot of the C code word of the fourth frame of 60 bits under the action of AND gate 85 which is enabled by the $A_4$ output terminal of the synchronizing signal generator and the 16th bit of the C code word. Similarly, AND gate 86 reset bistable circuit 82 during the 16th time slot of the first group of the next occurring group of 60 S bit words. Bistable circuit 62 is reset by the signal on the number 16 output terminal of the synchronizing signal generator.

Thus, in summary, the synchronizing circuit shown in FIG. 4, operates in the following manner. When the pulse repetition rate of the pulse transmitter has fallen below the 55 megabit per second rate and a control signal has to be inserted in the transmitted signal to enable the input signal to catch up with the output signal, the control signal is inserted at a predetermined time determined by a $_{control}$ pulse. That is to say, control signals are inserted into the output of a pulse transmitter in a predetermined one of the time slots allocated to the transmission of pulse signals from that transmitter. In the illustrative example of the third pulse transmitter, a control signal is inserted into the first time slot of the transmitting period bounded by the 15th and 16th S time slots of a first group, $A_1$, of 60 S time slots allocated to the transmission of information signals from this third pulse transmitter. This is accomplished by generating at the synchronizing signal generator a gating signal shown in FIG. 3B, during the transmission period in which the control signal is to be inserted, and generating a control signal occurring during the predetermined time slot allocated for the insertion of control signals when such insertion is necessary. To indicate that a control signal has been inserted in the output of the third pulse transmitter, three pulses are transmitted in the eighth, ninth and 10th time slots of the C code word and this signal serves to inform the receiver which synchronizing circuit has inserted a control signal so that the receiver may remove it. When the pulse repetition rate of the third tranmitter exceeds the nominal 55 megabit per second rate and it becomes necessary to delete a pulse signal from the transmitted signal in order that the output of the elastic store can catch up with the input, the signal is deleted at a time which does not correspond to any time slot of the transmission system allocated to the third pulse transmitter by reading out the signal from the store at such time and, by means of an INHIBIT gate, preventing its appearance at the output. The result is that the signal is not regenerated along the transmission line and is therefore deleted. In the $A_3$ group of the 60 S bit words, pulses are transmitted in the eighth, ninth and 10th time slots of the C code word indicating that pulse deletion has taken place from the output of the third pulse transmitter. The signal deleted is stored in a bistable circuit until the occurrence of the fourth frame, $A_4$, of the 60 S bit words and then information concerning the signal deleted is transmitted in the eighth, ninth and 10th time slots of the C code word of the $A_4$ group. In the event that a pulse was deleted from the output of the third pulse transmitter, three consecutive pulses are transmitted in the eighth, ninth and 10th time slots. In the event that a space was deleted, then three consecutive spaces are transmitted in that C code word.

Each of the other three pulse transmitters has a synchronizing circuit associated with it. These synchronizing circuits differ in their operation only in the time that a control signal is inserted into or deleted from the output of the pulse transmitter. Thus, a first of the synchronizing circuits transmits pulses from a first pulse transmitter in the first, fifth, ninth...etc., information time slots of each frame, and control signals may be inserted, when necessary, in the first time slot of the transmitting period occurring between the 15th and 16th S bits. The signal indicating that a control signal has been inserted in the signals from a first pulse transmitter or that a pulse signal has been deleted from the output of the pulse transmitter and the nature of the signal deleted is transmitted in the second to fourth time slots of the C code words.

Figure 5:
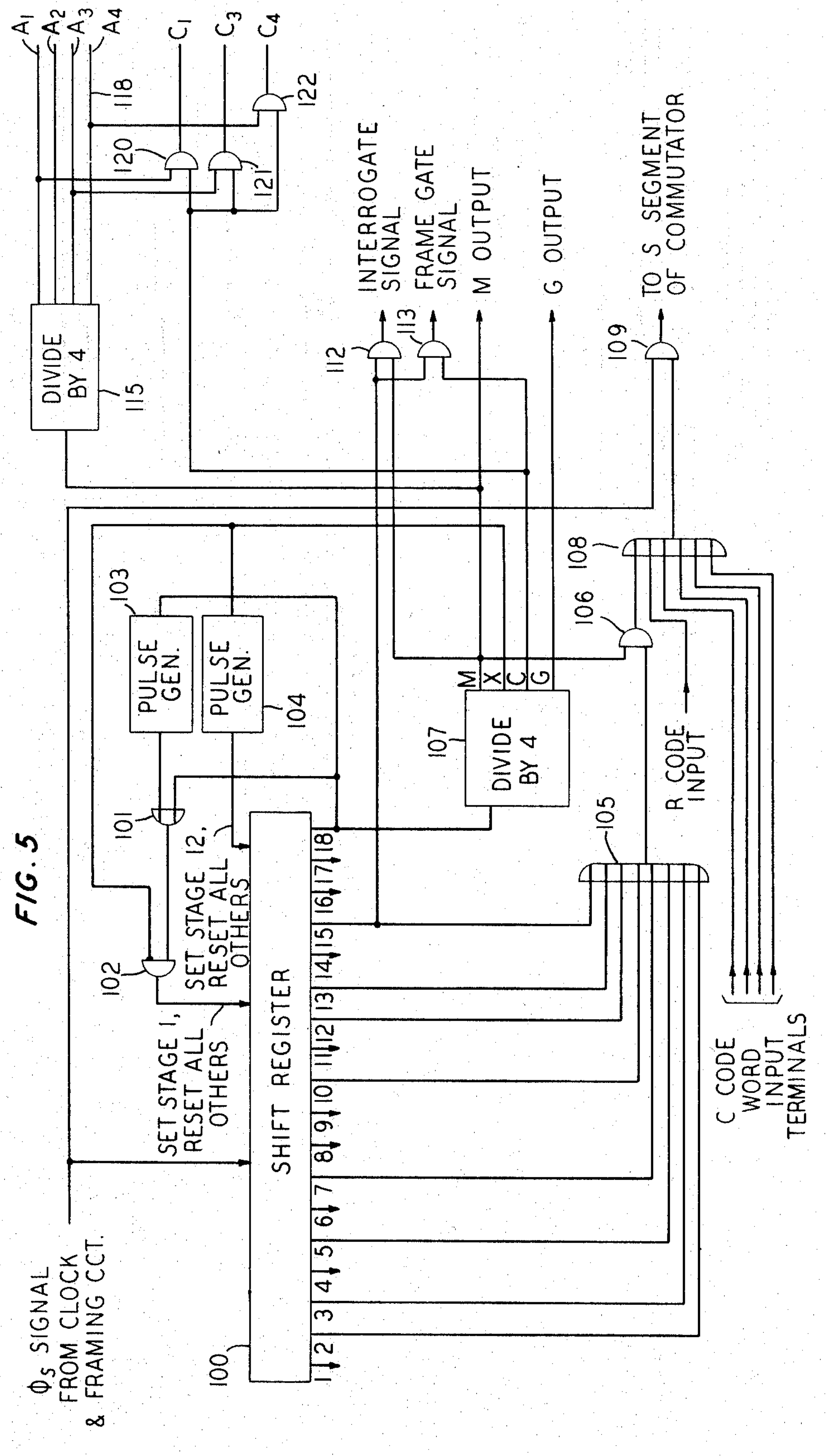
FIG. 5 is a block diagram of the synchronizing signal generator shown in FIG. 1.

The synchronizing signal generator 19 which controls the operation of the synchronizing circuits is shown in block diagram form in FIG. 5. It has nine function which are:

1. to generate the interrogate signal applied to the synchronizing circuit during the 15th time slot of each M code word,
2. to generate the M code,
3. to generate the gating signal in the transmitting period between the 15th and 16th bits of each C code,
4. to transmit any C codes generated by the synchronizing circuits,
5. to generate the $A_1$, $A_3$ and $A_4$ output signals for application to the synchronizing circuits,
6. to generate $C_1$, $C_3$ and $C_4$ output signals for application to the synchronizing circuit,
7. to generate M output and G output signals whose uses will be described below,
8. to generate signals which enable AND gate 68 of each synchronizing circuit during the three C code time slots allocated to that circuit, and
9. to generate reset pulses used to reset flip-flops 62, 72 and 82 of the synchronizing circuits.

To accomplish these results, a marking pulse is shifted through an 18-stage shift register 100. Initially, shift register 100 has all stages in the reset position save the first stage which is in the set position. A pulse occurring during each S bit, designated $_S$, shifts the shift register so that the marking pulse stored in the first stage of the shift register sequentially shifted through the 18 stages.

To insure that this procedure continues, the appearance of an output marking pulse at the output terminal of the 18th stage of the shift register 100 causes OR gate 101 to be enabled and the output marking pulse therefrom is transmitted through INHIBIT gate 102 and applied to the 18-stage shift register 100 to drive the first stage into the set condition and all others into the reset condition in accordance with techniques well-known in the art. A pulse generator 103 has its output terminal applied to a second input terminal of OR gate 101, and generator 103 normally generates a marking pulse once every 36 frames of the transmission system unless inhibited by an output signal from the output terminal of the 18th stage of shift register 100. Thus, if for some reason the marking pulse is not driven through the shift register in the manner above-described, pulse generator 103 will generate, after 36 S bits have occurred, a marking pulse to set stage one of the shift register to the set condition and reset all the other stages. Thus, generator 103 serves to insure the proper operation of the shift register in the event that the marking pulse being shifted through the register is lost due to circuit error.

Among the functions of the synchronizing signal generator shown in FIG. 5 is to generate the M code words, the X code words, the C code words and two other possible codes which follow the C code. The M code word comprises the pattern 011010100101101000, and the reasons for this particular code pattern will be discussed below in connection with the description of the synchronizing receivers. Accordingly, the M code is generated by applying the outputs from the second, third, fifth, seventh, 10th, 12th, 13th and 15th bistable circuits of shift register 100 to an OR gate 105 so that during the occurrence of the second, third, fifth, seventh, 10th 12th, 13th and 15th S bits OR gate 105 generates a mark. During the occurrence of the others of the first 18 output pulses from shift register 100, the output of OR gate 105 is a space. Thus, the output of OR gate 105 consists of the required M code and the output from OR gate 105 is applied to AND gate 106 which is enabled during the first 16 bits of the first group of 18 bits of 60 bits of the S signal by a signal generated by a divide-by-four circuit 107.

The function of divide-by-four circuit 107 is to divide each group of 60 S bits into four words, three of 18 bits each and one of six bits each. The first occurring group is an 18-bit word which comprises the M code word and is immediately followed by a 6-bit word comprising the X code. The G and R codes will be d below and the basic code pattern is that shown in FIG. 2 and previously discussed. To accomplish this result, the divide-by-four circuit has its input terminal connected to the output terminal of the 18th stage of shift register 100 and has four output terminals designated M, X, C and G, respectively. Initially, a voltage appears at the M output terminal of the divide-by-four circuit 107 and in response to the first output signal from the 18th stage of shift register 100, the reference voltage voltage is shifted to the X output terminal of the divide-by-four circuit 107.

The output signal at the X output terminal is also applied to a pulse generator 104 whose output signal is applied to shift register 100 so that at the time the output signal at the X output terminal first appears stage 12 is set and all other stages are reset. After the occurrence of six more S bits, the 18th stage of the shift register 100 will generate an output pulse thereby causing divide-by-four circuit 107 to shift an output signal from the X output terminal to the C output terminal. The X output terminal of the divide-by-four circuit 107 is also connected to the inhibit terminal of INHIBIT gate 102 so that the occurrence of the 18th bit of the M code words will not cause INHIBIT gate 102 to produce an output signal. Thus the pulse signal at the X output terminal of divide-by-four circuit 107 will be of six S bit duration. Thus, AND gate 106 is enabled during the time for transmission of the M code word by the reference voltage present at its input terminal connected to the M output terminal of divide-by-four circuit 107. Accordingly, the output of OR gate 105 is transmitted through AND gate 106 and then through OR gate 108 and applied to the S segment of commutator 21 by being gated through AND gate 109 under the control of the $_S$ signal from the clock and framing circuit. In response to the third and fourth signals at the 18th stage of shift register 101, a reference voltage will appear at the G and then the M output terminals of divide-by-four circuit 107.

When a synchronizing circuit either inserts a control signal into the signal supplied by its respective pulse transmitter or deletes a signal from the output of its respective pulse transmitters, a three-bit signal is generated by the OR gate 75 and its associated apparatus in the synchronizing circuit associated with that pulse transmitter as above-described. The signals generated by the OR gates 75 of each synchronizing circuit are each applied to one input terminal of OR gate 108 and then gated onto the transmission line during the S bit to indicate to the receiving apparatus which of these synchronizing circuits has either inserted a control signal into the pulse signal from its associated pulse transmitter or has deleted a signal from that transmitter. If a signal has been deleted, AND gate 83 in the synchronizing circuit produces an output signal, as described above, which is transmitted through OR gate 75 during the $A_4$ group of the S bit words and this signal is applied to OR gate 108 so that information as to the nature of the signal deleted is also transmitted during the S segment. In addition, an R code input terminal is applied to OR gate 108 and although the signal and the gate for its generation will be described in detail below, it suffices for now to note that it is associated with the multiplexing of signals from pulse transmitters having different pulse repetition rates.

The interrogate signal, the frame gate signal, the $A_1$, $A_3$, $A_4$ signals, and the $C_1$, $C_3$ and $C_4$ signals are generated in the following manner. The interrogate signal and the frame gate signal are generated by the M output signal from the divide-by-four circuit 107 and the output signal from the 15th stage of shift register 100. The M output signal of the divide-by-four circuit 107 and the output of 15th stage of shift register 100 are applied to AND gate 112 to generate the interrogate signal which occurs during the 15th bit of each M code. The frame gate signal is generated by AND gate 113 which is enabled by the output signal from the 15th stage of shift register 100 and the signal present at the C output terminal of the divide-by-four circuit 107 to generate a frame gate signal which begins upon the occurrence of the 15th S bit and terminates upon the occurrence of the 16th S bit of the C code word to insure that control signals are inserted or pulse information deleted during this time. The frame gate signal is shown in FIG. 3B.

To generate the $A_1$, $A_3$, $A_4$, $C_1$, $C_3$ and $C_4$ signals, a divide-by-four circuit 115 has its input terminal connected to the M output terminal of divide-by-four circuit 107 and has four output terminals $A_1$, $A_2$, $A_3$ and $A_4$. Initially, that is in the presence of the M code word, the divide-by-four circuit 115 has zeros present at output terminals $A_2$, $A_3$ and $A_4$, and a 1 present at output terminal $A_1$. Upon the occurrence of the second M signal from the divide-by-four circuit 107, output terminal $A_2$ has a 1 present thereon, and output terminals $A_1$, $A_3$ and $A_4$ have a zero present thereon. Upon the occurrence of the third M signal, a 1 is present at output terminal $A_3$ and zeros present at output terminals $A_1$, $A_2$ and $A_4$. Upon the occurence of the fourth M signal, a 1 is present at output terminal $A_4$, and zeros at output terminals $A_1$, $A_2$ and $A_3$.

To generate the $C_1$, $C_3$ and $C_4$ output signals, the $A_1$, $A_3$ and $A_4$ output signals are combined with the C output signal of the divide-by-four circuit 107. AND gate 120 is enabled only during the occurrence of the $A_1$ and C output signals so that the signal resulting therefrom is the $C_1$ output signal. Similarly, AND gate 121 is enabled only during the simultaneous occurrence of the $A_3$ and C output signals so that its output signal $C_3$ occurs only during the presence of C words during the third group, $A_3$, of the S bit signals. Similarly, AND gate 122 is enabled only during the occurrence of the fourth group, $A_4$, of the S bit signals and the occurrence of the C output control signal from the divide-by-four circuit 107.

In the description given above for the multiplexing of four pulse transmitters onto a high-speed transmission line, each of the four pulse transmitters might, for example, be a source of pulses of approximately a 55 megabit per second rate and the line a 220 megabit per second high-speed transmission line. Sometimes it is desirable not only to be able to time-division multiplex such high-speed sources on the line but also to be able to multiplex a large number of relatively low-speed sources onto such a line. For example, the regenerative pulse transmission system described on pages 1 —24 of the Jan. 1962 issue of the Bell System Technical Journal by C. G. Davis, operates at a 1.544 megabit per second rate, and it is therefore possible to multiplex the pulse signals from 144 of such transmission systems onto a 220 megabit per second high-speed line. For this purpose and where both high- and low-speed sources are multiplexed the equipment described above must be modified so that the possibility of error in transmitting information regarding the insertion of control signals is minimized and in addition, the insertion of control signals into each channel occurs at the closest possible time to the generation of a C code word indicating that the pulse signal from that transmitter has had a control pulse inserted therein.

To accomplish the former purpose, namely minimizing error in transmission of information as to when and where a control signal has been inserted, the overall makeup of the C and M code words has to be modified from that described above. Whereas before an M code word was transmitted followed by the generation of a C code word which denoted which, if any, of the four transmitters had a control signal inserted in its output, where 144 relatively low-speed pulse transmitters are to be multiplexed an extension of the above method would require the transmission of a first M code word followed by the transmission of C code word of at least 144 parts, each part comprising three bits or time slots. As a result, any transmission error resulting in an out-of-frame condition during the transmission of either the initial M code or any of the following C codes would result in the entire system being out-of-frame without the possiblity of restoration until the generation of the next M code which does not occur until approximately 450 additional transmission frames have occurred. Such an out-of-frame condition is almost intolerable.

Figure 6:
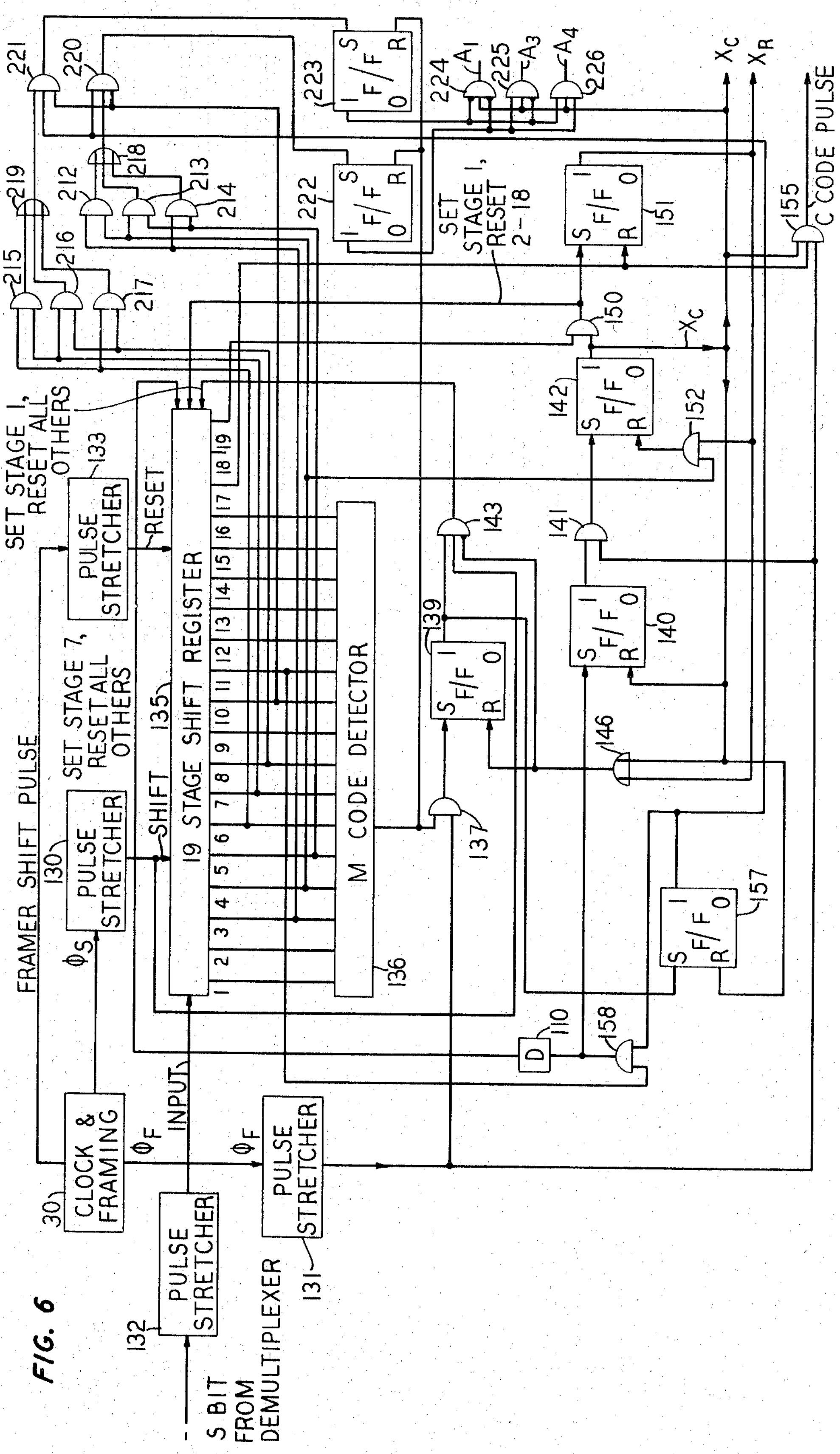
FIG. 6 is a block diagram of the synchronizing signal receiver shown in FIG. 1.

To minimize the length of time in which the system can be out-of-frame, the signal transmitted during the S time slot is modified in the following manner. Instead of transmitting an M code word followed by a C code word composed of three bits for each pulse transmitter and then a continuous train of zeros during the so-called G code word, the original allocation of 18 S bits for the C code is maintained and a so-called R code word is generated during one out of every 36 G code word time intervals. The resulting R code word is used as a framing signal in the S time slot so that the signals appearing in the S time slot have an R code word generated once every 1,944 frames (36 code intervals × 54 S bits per interval) of the transmission signal. In addition, the M and C code words are transmitted in the following manner. Following the initial generation of an R code word, an M code word is generated, followed by a C code word of four parts which are allocated to the first four pulse transmitters. A G code word of 18 zeros or spaces is then generated, and then a second M code word. The second M code word is followed by a C code word representing the fifth through eighth pulse transmitters, followed by the generation of a second G code word. A third M code word is then generated, followed by a C code word composed of four parts which are allocated to the ninth through 12th pulse transmitters. This process, shown diagrammatically in FIG. 6 of copending application, Ser. No. 507,008, filed Nov. 9, 1965 and assigned to the present assignee, shows that an M code word is generated once every 54 frames on the transmission line. As a result, proper identification of C code words associated with high-speed sources is resumed within 54 frames after an error in receiving an M code.

Figure 7:
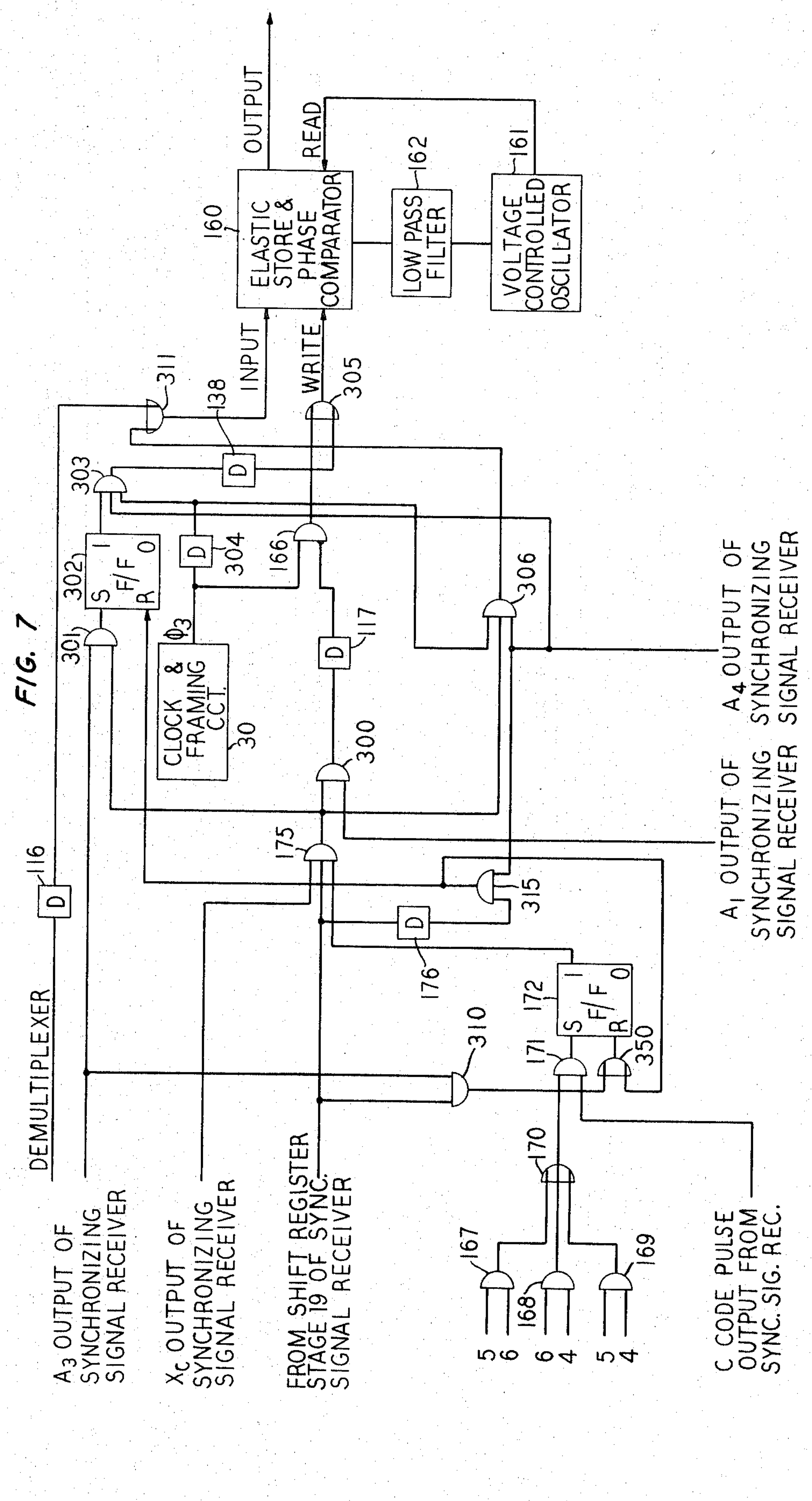
FIG. 7 is a block diagram of the synchronizing receiver shown in FIG. 1.

The R code word is generated by apparatus connected to the R input terminal of OR gate 108 of the synchronizing signal generator shown in FIG. 5. This apparatus is shown in FIG. 7 of copending application, Ser. No. 507,008 filed on Nov. 9, 1965 by V. I. Johannes and R. H. McCullough and assigned to the present assignee.

Whereas in the embodiment of the invention in which four high-speed pulse transmitters were multiplexed onto the very high-speed transmission system and control pulses were inserted and information deleted during the transmitting period bounded by the 15th and 16th bits of the C code word, it is sometimes desirable, particularly where high-speed and low-speed pulse transmitters are multiplexed onto a very high-speed transmission medium, to insert the control pulses and delete information when necessary for the various transmitters over a greater period of time. As an example, where 144 sources are to be multiplexed onto the high-speed line, control signals might be inserted between the 15th and 17th S bits of the C code words. For this purpose, it is necessary to generate two additional frame gate signals in addition to the frame gate signal shown in FIG. 3B. To accomplish this, a frame gate generator circuit shown in FIG. 8 of the above-mentioned copending application, Ser. No. 507,008, is employed. The resulting frame gate signals are shown in FIGS. 3E and 3F.

The synchronizing signal receiver 40 at the receiving terminal has a number of functions. The first function is to recognize a transmitted M code word so that a timing reference may be created at the receiving terminal. The second function, broadly stated, is to generate signals to inform the synchronizing receivers 35, 36...37, to check for the presence of signals within the C code words which indicate that control signals have been added to or pulse signals deleted from the output of the pulse transmitters 10, 11...12, at the transmitting terminal. These latter signals are designated as XC, XR, $A_1$, $A_3$ and $A_4$ in FIGS. 6 and 7.

The clock and framing circuit 30 at the receiving terminal supplies marks designated $_s$, $_f$ during the time slots assigned to each S bit and each F bit, respectively. These pulses, which are relatively narrow pulses, are widened by pulse stretchers 130 and 131, respectively. The input signal of the shift register 135 comprises the signals taken from the S segment of commutator 25, stretched by pulse stretcher 132, and these signals are shifted through the 19-stage shift register 135 under the control of the $_s$ signal occurring during each S bit so that after 19 S bits have been received, the first 16 bits of the M code word are represented at the first through 16th output terminals of shift register 135.

The 17th and 18th bits of the M code word are zeros or spaces which provide spacing between the M and X code words. The first 16 of these S bits, therefore, represent the significant portion of the M code word and M code detector 136 which is a count comparator, such as that described in copending application of C. G. Davis and L. C. Thomas, Ser. No. 332,152, filed on Dec. 20, 1963, generates an output signal when the signal stored in the first 16 bits, 1 through 16 of shift register 135, corresponds with no more than two errors, to the predetermined pulse pattern 0110011001011010.

This pattern has been chosen because examination of the M code word reveals that despite the presence of two errors in this pattern of 16 bits and two errors elsewhere in the 60 S bit group, it is impossible for any other portion of the group to be mistaken for the M code word. In addition, two or less errors in the M code words still make it possible to accurately determine the presence and time of occurrence of the M code word.

The output of the M code detector 136 indicating that an M code word has been detected is applied to an AND gate 137 which is enabled during the next occurring $_f$ signal to set a bistable circuit 139. The 1 output terminal of bistable circuit 139 is applied to an INHIBIT gate 143 which is enabled during the next occurring S bit of the transmitted signal. As a result, one frame after the M code word has been received the output of INHIBIT gate 143 is applied to set stage 1 of the shift register and reset all the other stages. This action creates a timing reference within the shift register during the 17th bit of the M code which is shifted through the register under the control of the $_s$ signal generated by the clock and framing circuits 30 during the occurrence of each S bit.

The 1 output terminal of bistable circuit 139 is also applied to the set input terminal of bistable circuit 157 so that bistable circuit 157 is placed in the set condition following the detection of an M code.

The timing reference created within the shift register during the 17th bit of the M code is shifted through the shift register under the control of the $_s$ signal. Following the insertion of the timing reference pulse, a zero corresponding to the 18th bit of an M code word is read into the shift register. The next six bits of the signal occurring at the S bit of the multiplexer correspond to the six bits of the X code word and are read into the shift register under the control of the $_s$ signal applied to the register by pulse stretcher 130. As a result, when the timing reference mark reaches the 10th output terminal of the shift register, the entire X code word has at that time been read into the shift register 135 and is present in the third through eight output terminals thereof. Immediately thereafter, the shift register is examined to decode the X code words and determine which of the four groups $A_1$, Ad 2, $A_3$, $A_4$ of the 60 S bit words is being received. Toward this end, AND gates 212, 213, 214, 215, 216 and 217 are provided which operate in conjunction with OR gates 218 and 219 and AND gates 220 and 221 and bistable circuits 222 and 223 to generate signals indicative of the nature of the X code word. The above-mentioned apparatus is connected to the respective output terminals of the shift register as indicated in the drawing so that the X bit words which are six bits in length are decoded into 2-bit words. Thus, AND gate 212, for example, has its two input terminals connected to the third and fourth output terminals of the shift register. Similarly, AND gate 213 has its two input terminals connected to the fourth and fifth output terminals of the shift register. AND gate 214 has its two input terminals connected to the third and fifth output terminals of the shift register. Since the output signals from AND gates 212, 213 and 214 are applied through OR gate 118, the result is that OR gate 218 will generate an output signal whenever two of the last three transmitted bits of an X code word are ones. Similarly, OR gate 219 will generate an output signal whenever any two of the first three bits of an X code word are ones. This is because AND gate 215 is connected to the sixth and seventh output stages of the shift register; AND gate 216 is connected to the seventh and eight output terminals of the shift register; and AND gate 217 is connected to the sixth and eight output terminals. Thus, when any two of the sixth through eighth output terminals have a 1 present thereon, this resulting signal is applied to the OR gate.

OR gate 218 has its output terminal connected to an input terminal of three input terminal AND gate 220. Similarly, OR gate 219 has its output terminal connected to an input terminal of three input terminal AND gate 221. These AND gates 220 and 221 are enabled whenever an output signal is present at the 1 output terminal of bistable circuit 157 during the same time that a 1 is present at the 10th output terminal of the shift register 135. This occurs when the X code words are present in the third through eighth stages of the shift register. Thus, if the X code word consists of six consecutive zeros, neither AND gate 220 nor AND gate 221 will produce an output signal. If, howver, the X code word comprises six consecutive pulses of two or more pulses in the first group of three time slots of the X code word, and two or more pulses in the second group of three time slots of the X code word, then both AND gates 220 and 221 will produce an output signal. Similarly, if two of the first three time slots of the X code words contain ones, and less than two of the last three time slots contain a one, then AND gate 221 will produce an output signal and AND gate 220 will produce no output signal. This is the condition which indicates that the second $A_2$ of the 60 bit words is present, and as will be recalled from the above, this interval is not employed in the described embodiment of the invention. If more than two of the first three time slots of an X code word contain ones and less than two of the last three time slots contain ones, then AND gate 220 will produce an output signal and AND gate 221 will produce no output signal. This condition represents the third group, $A_3$, of the 60 S bit words and indicates that the C code words contain information with respect to the fact that a signal has been deleted from a particular one of the pulse transmitters. Finally, in the event that a pulse has been deleted, then more than two consecutive pulses will be transmitted in each of the two three-bit groupings while if a space has been deleted, all zeros will be transmitted. As a result, the information as to whether a pulse or a space has been deleted is redundantly coded so that if two out of three times slots in a three-bit group contain pulses, it is assumed that three pulses were transmitted, while if less than two pulses are received, it is assumed that all zeros were transmitted.

The output signals from AND gate 220 and 221 are applied to bistable circuits 222 and 223 to set these circuits and produce at their output terminals an indication of the nature of the signal transmitted in the X code word. These bistable circuits are reset by the next occuring output signal from the M code detector.

The signals generated by bistable circuits 222 and 223 are combined at INHIBIT gates 224 and 225 and AND gate 226 to generate signals indicating whether pulse stuffing, pulse deletion, or the nature of the pulse deleted is being signaled. For example, when no pulses appear at the 1 output terminals of bistable circuits 222 and 223 there is no inhibiting signal applied to INHIBIT gate 224 so that the $X_C$ signal applied to the input terminal of INHIBIT gate 224 will then generate a 1 output signal indicating that the $A_1$ group is being received. Similarly, when the $A_3$ group occurs pulses appear at the 1 output terminal of bistable circuit 222 and no pulse appears at the output of bistable circuit 223. Since the 1 output terminal of bistable circuit 222 is applied to the input terminal of INHIBIT gate 225 while the output terminal of bistable circuit 223 is applied to the INHIBIT terminal of gate 225, gate 225 will generate an output signal when the word transmitted during the X code word interval is 111000 indicating as discussed above that pulse deletion is to take place. Finally, presence of the $A_4$ group is indicated by an output from AND gate 226 which has its input terminals connected to the 1 output terminal of both bistable circuits 222 and bistable circuit 223. If the X code word contains less than two pulses in each of its three-bit groups, then the output signal from AND gate 226 is a zero, but if each of the two groups contain two or more pulses, then the output from AND gate 226 is a 1 indicating to the synchronizing receiver that the $A_4$ group, in which the nature of deleted pulses is signaled, is present.

When the timing reference mark inserted in the shift register reaches the 11th output terminal of the shift register, bistable circuit 140 is set by the output of AND gate 158 which is enabled by the output signal from the 1 output terminal of bistable circuit 157 and the output signal at the 11th stage of the shift register. The output of bistable circuit 140 is gated through AND gate 141 upon the occurrence of the next framing bit to set bistable circuit 142. Thus, bistable circuit 140 acts as an isolation circuit and the output of bistable circuit 142 is a signal designated $X_C$ which is applied both internally within the synchronizing signal receiver and, in addition, to the synchronizing receivers to indicate that C code words are now being received. The output of bistable circuit 142 is, in addition, used to reset bistable circuits 140 and 157. In addition, the $X_C$ signal is applied to an OR gate 146 to inhibit the INHIBIT gate 143 and effectively turn OFF the M code detector during the presence of C code words. The output from OR gate 146 also resets bistable circuit 139. After a delay provided by delay circuit 110, the output of AND gate 158 is applied to the shift register to set stage number seven and reset all the other stages.

The synchronizing receivers 35, 36...37, continue to receive a signal until the timing mark inserted in the seventh stage of the shift register 135 has been shifted to the 19th stage at which time any portion of a received C code word indicating the insertion, deletion and nature of a deleted signal will have been received and detected by the synchronizing receivers as explained below. Accordingly, when the timing mark reaches the 19th stage of the shift register and AND gate 150 is enabled to set a bistable circuit 151 which generates a reference voltage, $X_R$, at its 1 output terminal to inform the receiving apparatus to look for either a G code word or an R cod e word whose function will be discussed below. In addition, the output of AND gate 150 is applied to shift register 135 to set stage one of the shift register and reset stages two through 18 so that a new timing mark is generated. The $X_R$ signal is also supplied to an AND gate 152 which is enabled when the next S bit has been received, so that bistable circuit 142 is reset and, in addition, the $X_R$ signal inhibits the output of M code detector 136 by inhibiting INHIBIT gate 143 through OR gate 146. During the time interval between the second timing mark being inserted into the shift register by the output of the AND gate 150 and that timing mark reaching the 17th stage of shift register 135, the $X_R$ signal is applied to the synchronizing receivers to determine whether an R code is present.

Still another signal is generated by the synchronizing signal receiver. This signal is designated as a C code pulse which is employed, as explained below, by the synchronizing receivers one of which is shown in FIG. 7. The C code pulse is applied to the synchronizing receivers to check for a C code word indicating that one or more pulse transmitters have had a control signal inserted in their output signals. It is generated, when the 13th S bit of each C code word is received, by an AND gate 155 which is enabled by the framing signal , from the clock and framing circuit.

Provision is made at the synchronizing signal receiver 40 for loss of synchronization. The clock and framing circuit 30 a has a so-called framer shift pulse output terminal at which a pulse appears whenever the clock and framing circuit 30 indicates an out-of-frame condition. This framer shift pulse is stretched by a pulse stretcher 133 and is used to reset all the stages of the shift register and start the process of looking for an M code word all over again. This is based on the assumption that whenever the system goes out-of-frame, any timing marks or information stored in the 19-stage shift register are in error and it is best to reset all the stages to zero and start the process again.

A synchronizing receiver for the third of the above-described high-speed pulse transmitters is shown in FIG. 7. The incoming signals from the demultiplexer are applied through delay circuit 116 and OR gate 311 to an elastic store 160, with the signals written into the store under the control of the clock and framing circuit 30 which generates a write-in signal applied to the write terminal of the store 160, through INHIBIT gate 166 and OR gate 305, during the third, seventh, 11th...etc., time slots. The rest of the equipment shown in FIG. 7 serves to read out the pulse signals while deleting any control signals inserted by the synchronizing circuits or restoring any pulse information deleted by the synchronizing circuits in order to effect synchronization.

The readout of the elastic store 160 is controlled by a voltage controlled oscillator 161 which is turn is controlled by the phase output voltage of store 160 by means of a low pass filter 162. The voltage controlled oscillator generates a signal having a frequency equal to the average pulse transmission rate of the pulse transmitter when the store 160 is stored to one-half its capacity. If the occupancy of store 160 is less than one-half its capacity, the oscillator reduces its output frequency so that information is read out at a slower rate. Conversely, if the occupancy of the store is high, the oscillator increases its output frequency to speed up the readout of pulse signals from the store.

As discussed above, control signals are inserted, when necessary, or deleted when necessary, in a predetermined one of the time slots shown as $_3$ in FIG. 3D allocated to this pulse transmitter. A signal generated by apparatus to be described below activates AND gate 300 which inhibits the INHIBIT gate 166 and thus prevents the writing of information into the store during that predetermined time slot when a control signal has been inserted therein. A signal generated by apparatus to be described below activates OR gate 311 to write in any signal deleted by the pulse transmitter. The signal from the demultiplexer is delayed in delay circuit 116 so that a signal restoring the deleted signal is available at OR gate 311 at the correct time for restoration.

The function of the apparatus shown in the left-hand portion of FIG. 7 is to ascertain when three pulses have been transmitted in the eighth, ninth and 10th time slots of a C code word indicating that a control pulse has been inserted into or a signal deleted from the output of the third transmitter. For this purpose, three AND gates 167, 168 and 169 are provided. AND gate 167 has its input terminal connected to the fifth and sixth stages of the shift register in the synchronizing signal receiver, while AND gates 168 and 169 have their input terminals connected to the fourth and sixth and fourth and fifth stages respectively of that shift register. Upon the occurrence of the C code pulse from the synchronizing signal generators during 13th bit of the C code word, one or more AND gates 167, 168 and 169 will be enabled if three pulses were transmitted in the eighth, ninth and 10th time slots of the C code word. This is because such pulses are stored in the fourth, fifth and sixth stages of the shift register of the synchronizing signal receiver at this time. Two or more of AND gates 167, 168 and 169 will generate an output pulse at this time provided that not more than one transmission error has occurred in the transmission of the three pulses.

The output signals from AND gates 167, 168 and 169 are applied to the input of an OR gate 170 whose output together with the C code pulse signal from the synchronizing signal receiver 40 enables an AND gate 171 to set a bistable circuit 172. The 1 output terminal of bistable circuit 172 is connected to one input terminal of an AND gate 175 whose second input terminal is connected to the $X_C$ output of the synchronizing signal receiver. The third input terminal of AND gate 175 is connected to the output terminal of shift register stage 19 of the synchronizing signal receiver so that AND gate 175 is enabled when the timing mark applied to the seventh stage of the shift register during the third bit of the C code reaches the 19th 19th stage. The output of AND gate 175 is applied to one input terminal of an AND gate 300 which is enabled by the $A_1$ output signal from the synchronizing signal receiver 40. AND gate 300 is enabled in precisley the time slot that control signals were inserted in the output of the high-speed pulse transmitter at the transmitting terminal. The output of AND gate 300 generates an output signal which after being delayed in delay circuit 117, which has delay equal to that of delay circuit 116 through which the demultiplexed signal passes, inhibits INHIBIT gate 166 so that no information is read into the store. The fact that any control pulses were inserted into the output signals from the pulse transmitters at this time may be verified by noting that when the timing mark has reached the 19th stage of shift register 135, the 15th S bit of the C code word has just been received and it is in this time interval as shown in FIG. 3 that control signals are inserted into the high-speed signals.

The fact that an information signal has been deleted from the output of a pulse transmitter is indicated at the receiver by the simultaneous occurrence of an output signal from AND gate 175, indicating the transmission of a C code word for respective pulse transmitter, and the $A_3$ output signal from the synchronizing signal receiver. These two signals occurring simultaneously enable AND gate 301 whose output signal indicating that pulse deletion from the pulse transmitter has taken place, sets a bistable circuit 302 whose 1 output terminal is applied to an AND gate 303. AND gate 303 is enabled by the $_3$ signal delayed by half the interval between $_3$ pulses by delay circuit 304 and the $A_4$ output of the SYNC signal generator and the resulting signal applied through delay circuit 138, which has delay equal to that of 116 and 117, and OR gate 305 to the WRITE input of the elastic store 160 which is thereby activated to insert an additional signal between occurrence of the predetermined $_3$ signals of the $A_4$ frame. Delay circuits 116 and 117 delay the signals by a time corresponding to 60 bits to allow time for arrival of the $A_4$ group, which contains information as to whether a pulse or space has been deleted.

AND gate 306 generates a signal indicative of whether a pulse or a space has been deleted. It is enabled by AND gate 175. At the 15th S bit of the $A_3$ frame bistable circuit 172 has been reset by the output of AND gate 310 applied to its reset terminal through OR gate 350. If a 1 has been deleted then in the $A_4$ group bistable circuit 172 will again be set by the output signal from OR gate 170 transmitted through AND gate 171. When the 19th stage of shift register 135 produces an output signal during the $A_4$ group AND gate 175 will produce an output signal if bistable circuit 172 is in the set condition indicating that a 1 weas deleted. If a zero was deleted bistable circuit will be in the reset condition and gate 175 will produce no output signal. If a 1 was deleted AND gate 306 will be enabled at the same time as the signal from AND gate 303 arrives at the output of delay circuit 138 and a 1 will be read through OR gate 311 into store 160. If a zero was deleted OR gate 311 will produce no output signal at the time that the signal from AND gate 305 arrives at the output of delay circuit 138 and a zero will be written into store 160. Bistable circuits 302 and 172 are reset by AND gate 315. AND gate 315 is enabled by the $A_4$ output of synchronizing signal receiver 40, and a pulse from shift register stage 19 delayed in delay circuit 176. This delay delays the reset of bistable circuits 302 and 172 until the action described above is completed.

There are 144 C code words generated between each R code word. Where low-speed sources or both low- and high-speed sources are multiplexed together, apparatus must be provided at the receiving terminal to recognize when a C code word associated with a particular low-speed source has been transmitted. Thus, for example, where three relatively high-speed sources of 55 megabits per second pulse rate are multiplexed onto a 220 megabit per second pulse rate transmission line, 36 time slots of the transmission frame may be allocated for the transmission of data from relatively low-speed sources having a pulse repetition rate of only 1.5 megabits per second. For this application, as explained above, the signals transmitted in the S bit time slots are divided into groups containing an M code word followed by C code words with three parts of each C code word allocated to the transmission of signals from the high-speed sources and the remaining part allocated to all of the remaining 36 low-speed sources. In such a situation, it is necessary to determine which of the 36 groups of C code words is being transmitted in order that the receiving apparatus can both remove control signals and insert deleted signals from low-speed sources. To accomplish these results, the apparatus shown in FIGS. 12 and 13 of the above-mentioned copending application may be employed.

It is to be understood that the above-described arrangements are illustrative of the principles of the invention. Numerous other arrangements may be devised by those skilled in the art without departing from the spirit and scope of the invention. For example, it should be recognized that synchronization of signals having nominal bit rates, which are various multiples of other basic rates, can also be accomplished, and that the invention is not limited to those described as examples above. As a further example, it should be recognized that establishment of a time reference for the synchronization signal may be accomplished by other techniques known to those skilled in the art, such as that described in U.S. Pat. No. 2,984,706 issued to H. M. Jamison et al. on May 16, 1961. In addition, it will be apparent to those skilled in the art from a reading of the above description of apparatus embodying the invention that there is no necessity for performing both pulse deletion and insertion of control signals where all the pulse transmitters have a repetition rate which exceeds that of the rate of that portion of the transmission line onto which they are multiplexed. In such a situation, only the apparatus performing the pulse deletion operation would be required in order to effect synchronization.

As a further example, it should be recognized that in an application where delay circuits 116, 117 and 138 are inconvenient to realize, the S-bit format can be rearranged to bring the signal indicating deletion, the signal indicating whether the deleted pulse is 1 or 0, and the time at which the deletion is performed into temporal proximity, thus eliminating the need for long delays.

We claim:

1. In combination, a transmitting terminal, a common time-divided transmission facility, and a receiving terminal, a plurality of $n$ asynchronous pulse sources whose pulse trains are to be multiplexed on said common time-divided pulse transmission facility, means at said transmitting terminal for converting the pulse repetition rate of each of said pulse trains to a common lower pulse repetition rate by the deletion of signals from said pulse trains, means at said transmitting terminal for multiplexing said converted pulse trains on said common time-divided transmission facility, means at said transmitting terminal for generating a first predetermined code word to establish a time reference, means at said transmitting terminal for generating a second predetermined code word composed of $n$ portions each portion being allocated to a predetermined one of said pulse sources to indicate when an output signal has been deleted from a pulse train, means for generating a third predetermined code word composed of $n$ portions each portion being allocated to a predetermined one of said pulse sources to indicate the nature of the signal deleted from the output of a pulse source, means for transmitting each bit of said code words in a predetermined portion of the transmission space of said transmission facility, means to repeat the transmission in said predetermined portion of the transmission space of said first code word prior to the transmission of said second and third code words to reestablish said time reference and to determine that a pulse signal has been deleted from the output of a pulse source and the nature of the signal deleted, means at the receiving terminal for demultiplexing the transmitted signals, means at the receiving terminal to recreate said time reference in response to the reception of said first code words, and means at said receiving terminal responsive to said time references generated at said receiving terminal and the reception of said second and third code words for inserting deleted pulse signals into the demultiplexed signals.

2. In combination, a transmitting terminal, a common time-divided transmission facility, and a receiving terminal, a plurality of $n$ asynchronous pulse sources whose pulse trains are to be multiplexed on said common time divided pulse transmission facility, means at the transmitting terminal for converting the pulse repetition rate of those pulse trains whose repetition rates are less than the repetition rate of the transmission space allocated for their transmission to a common higher repetition rate by the insertion of control signals into each such pulse train, means at the transmitting terminal of said transmission facility for converting the pulse repetition rate of each of said pulse trains whose repetition rate is greater than the repetition rate of the transmission space allocated for the transmission of that pulse train to a common lower pulse repetition rate by the deletion of signals from those said pulse trains, means at the transmitting terminal for multiplexing said converted pulse trains on said common time-divided transmission facility, means at the transmitting terminal of said facility for generating a first predetermined code word to establish a time reference, means for generating a second predetermined code word composed of $n$ portions each portion being allocated to a predetermined one of said pulse sources to indicate the presence of an inserted control signal in the pulse train from any of said pulse sources, means for generating a third predetermined code word composed of $n$ portions each portion being allocated to one of said pulse sources to indicate when an predetermined signal has been deleted space of said first code word prior to the transmission of said pulse train, means for generating a fourth predetermined code word composed of $n$ portions each portion being allocated to a predetermined one of said pulse sources to indicate the nature of the signal deleted from the output of a pulse source, means for transmitting each bit of said code words in a predetermined portion of said common time-divided pulse transmission facility, means to repeat the transmission in said predetermined portion of the transmission space of said first code word prior to the transmission of said second, third and fourth code words to reestablish said time reference and determine that a control signal has been added to the output of a pulse source and to determine that a pulse signal has been deleted from the output of a pulse transmitter and the nature of the signal deleted, means at said receiving terminal for demultiplexing the transmitted signals, means at said receiving terminal to recreate said time reference in response to the reception of said first code words, means at said receiving terminal responsive to said time reference generated at said receiving terminal and the reception of said second generated code words for removing inserted control signals from the demultiplexed signals, and means at said receiving terminal responsive to said time reference generated at said receiving terminal and the reception of said third and fourth code words for inserting deleted pulse signals into the demultiplexed signals.

3. In combination, a transmitting terminal, a common time-divided transmission facility whose transmission space is divided into frames, and a receiving terminal, a plurality of asynchronous pulse source whose output pulse trains are to be multiplexed on said common time-divided pulse transmission facility, means at the transmitting terminal for converting the pulse repetition rate of those pulse trains whose repetition rates are greater than the repetition rate of the transmission space allocated for the transmission of that pulse train to a common lower pulse repetition rate by the deletion of signals from those said pulse trains, means at said transmitting terminal for multiplexing said converted pulse trains on said common time-divided transmission facility, means at the transmitting terminal of said facility for generating a first predetermined code word to establish a time reference comprising, a shift register having at least S stages where S is the number of time slots in said first predetermined code word, means to insert a marking pulse in the first stage of said shift register and a space in all other stages, means to shift said marking pulse through said shift register under the control of a signal generated during a predetermined time slot of said transmission frame in which said code signals are transmitted, an OR gate connected to the output terminals of selected stages of said shift register so that the signal appearing at the output terminal of said OR gate constitutes said first code word, and AND gate connected to receive the output of said OR gate, a divide-by-four circuit having a plurality of output terminals and an input terminal connected to receive an input signal from the output of one of the stages of said shift register, the output signal from a first output terminal of said divide-by-four circuit indicating that the time of occurrence of first said code word is present, means to enable said AND gate with said output signal from said first output terminal of said divide-by-four circuit, a second OR gate connected to receive the output of said AND gate, and a second AND gate the output terminal of said second OR gate being connected to one input terminal of said second AND gate which is enabled by a signal applied to a second input terminal during each predetermined time slot of said transmission frame during which a code bit is transmitted, and whose output terminal is connected to said transmission facility, means for generating a second predetermined code word to indicate when an output signal has been deleted from a pulse train, means for generating a third predetermined code word to indicate the nature of the signal deleted from the output of a pulse source, means for transmitting each bit of said code words in a predetermined portion of said common time-divided pulse transmission facility, means at said receiving terminal of said transmission facility for demultiplexing the transmitted signals, means at said receiving terminal to create a time reference in response to the reception of said first code word, and means at said receiving terminal responsive to said time reference generated at said receiving terminal and the reception of said second and third code words for inserting deleted pulse signals into the demultiplexed signals.

4. In combination, a transmitting terminal, a common time-divided transmission facility and a receiving terminal, a plurality of asynchronous pulse sources whose output pulse trains are to be multiplexed on said common time-divided transmission facility, means at said transmitting terminal for converting the pulse repetition rate of each of said pulse trains whose pulse repetition rate is greater than the repetition rate of the transmission space allocated for he transmission of that pulse train to a common lower pulse repetition rate by the deletion of signals from those said pulse trains, means at said transmitting terminal for multiplexing said converted pulse trains on said common time-divided transmission facility, means at said transmitting terminal for generating a first predetermined code word to establish a time reference, means for generating a second predetermined code word to indicate when an output signal has been deleted from a pulse train, means for generating a third predetermined code word to indicate the nature of the signal deleted from the output of a pulse source, means for transmitting each bit of said code words in a predetermined portion of said common time-divided pulse transmission facility, wherein said means at the transmitting terminal for converting the pulse repetition rate of said pulse trains to a common lower pulse repetition rate by the deletion of signals and said means for generating said second and third predetermined code word comprises in combination, an elastic store having a pulse input terminal, a pulse output terminal, and a phase output terminal a at which a voltage is generated indicative of the occupancy of said store, means for periodically reading pulse signals out of said store, means for applying one of said asynchronous pulse trains to the pulse input terminal of said store, comparison means connected to the phase output terminal of said store to generate an output signal when the occupancy of said store falls below a predetermined value, means for periodically examining the output signal from said comparison means at a predetermined examining time and generating an output signal from a first AND gate when the occupancy of said store has fallen below a predetermined value at that time, a bistable circuit connected to receive the output signal from said first AND gate to generate a reference signal indicative of the fact that a signal is to be deleted from the output signal of said elastic store, gating means connected to receive the output signal from said bistable circuit to generate a signal to read out a pulse signal from said elastic store without transmitting it on said transmission facility, a second AND gate which is enabled by the output voltage from said bistable circuit during the time allocated to the occurrence of said second code word to generate said second predetermined code word indicative of the fact that a signal has been deleted from a pulse train, a second bistable circuit connected to receive the signal readout of said elastic store and not transmitted on said transmission facility, a third AND gate responsive to the output signal from said second bistable circuit to generate said third predetermined code word indicative of the nature of the signal deleted during the time allocated to the occurrence of said third code word, means at said receiving terminal of said transmission facility for demultiplexing the transmitted signals, means at said receiving terminal to create a time reference in response to the reception of said first code word, and means at said receiving terminal responsive to said time reference generated at said receiving terminal and the reception of said second and third code words for inserting deleted pulse signals into the demultiplexed signals.

5. In combination, a transmitting terminal, a common time-divided transmission facility and a receiving terminal, a plurality of asynchronous pulse sources whose output pulse trains are to be multiplexed on said common time-divided transmission facility, means at said transmitting terminal for converting the pulse repetition rate of those pulse trains whose repetition rates are greater than the pulse repetition rate of the transmission space allocated for their transmission to a common lower pulse repetition rate by the deletion of signals from those said pulse trains, means at said transmitting terminal for multiplexing said converted pulse trains on said common time-divided transmission facility, means at the transmitting terminal of said facility for generating a first predetermined code word to establish a time reference, means for generating a second predetermined code word to indicate when an output signal has been deleted from a pulse train, means for generating a third predetermined code word to indicate the nature of the signal deleted from the output of a pulse transmitter, means for transmitting each bit of said first, second, and third code words in a predetermined portion of said common time-divided pulse transmission facility, means at said receiving terminal of said transmission facility for demultiplexing the transmitted signals, means at said receiving terminal to create a time reference in response to the reception of said first code word comprising, a shift register having an input terminal and at least S stages where S is the number of bits in said first predetermined code word, means to apply said signals transmitted in said predetermined portion of said transmission facility allocated to the transmission of said codes to said input terminal of said shift register, means to shift said shift register in response to each such received predetermined bit, detector means to detect the presence of said first predetermined code word in said shift register, means responsive to said detector means to insert a timing mark in said first stage of said shift register upon the occurrence of said first predetermined bit, and means at said receiving terminal responsive to said time reference generated at said receiving terminal and the reception of said second and third generated code words for inserting signals deleted from the demultiplexed signals at the transmitting terminal.